Oct. 11, 1932.   H. WOCHNER   1,881,988

AUTOMOBILE AXLE PRESS

Original Filed Dec. 21, 1928

INVENTOR.
Henry Wochner.
BY Walter N. Haskell.
his ATTORNEY

Patented Oct. 11, 1932

1,881,988

UNITED STATES PATENT OFFICE

HENRY WOCHNER, OF ROCK ISLAND, ILLINOIS, ASSIGNOR TO BEAR MANUFACTURING COMPANY, OF ROCK ISLAND, ILLINOIS, A CORPORATION

AUTOMOBILE AXLE PRESS

Original application filed December 21, 1928, Serial No. 327,643. Divided and this application filed February 7, 1930. Serial No. 426,549.

My invention has reference to a press for automobile axles, of a class set forth in my former application for Letters Patent of the United States filed December 21st, 1928, Serial No. 327,643, out of which the present application is divided. One of the fundamental parts of the invention set forth in said former application was a cross-beam of a special construction rigidly held in the side-walls of a pit, sufficiently deep for the convenience of workmen desiring to work beneath the cross-beam. The original invention had for its purpose the straightening of an axle in a vertical plane, whereas the present invention was more specially designed for assisting in the straightening of an axle in a horizontal plane. The invention is also of a construction which renders it readily adaptable to and usable with a cross-beam constructed and supported in the manner shown and set forth in said former application, but it is not limited thereto, as the apparatus can be supported and operated on any cross-beam of suitable construction and held rigidly in place.

One of the chief objects set forth in said former application was the straightening of an axle without removing the same from the vehicle, and without heating the same before operating thereon. To this end the present invention comprises one of several sets of tools by the use of which an axle can be restored to its original condition, while cold, after having been bent in a vertical or horizontal plane, or twisted out of shape.

The particular construction, arrangement, and operation of the invention will be more fully understood from the following specification, reference being had to the accompanying drawing, in which:—

Figure 1:
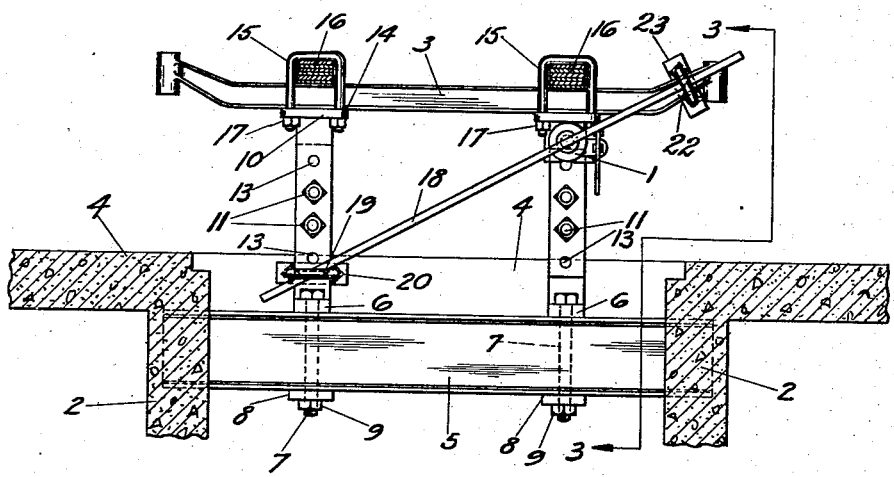
Fig. 1 shows the invention in front elevation.

The side walls 2 of a workmen's pit are shown in Fig. 1, beneath the surface of a floor 4, and anchored at its ends in said walls is a cross-beam formed of spaced channel-plates 5. Mounted on said cross-beam is a pair of axle-supports each consisting of an angle-plate 6, the base of which is perforated to receive a bolt 7 passing downwardly between the channel-plates 5, and secured to an anchor-plate 8 by means of a nut 9. Fixed to the angle-plate 6 is an angle-plate 10, by means of bolts 11 passing through openings in said plates, a series of such openings 12 being formed in the plate 6 and similar openings 13 in the plate 10, permitting a vertical adjustment of the latter plate. The horizontal portion of the angle-plate 10 is provided with eyes 14 to receive the ends of U-bolts 15, which pass around the spring 16 of the vehicle, and are held in place by nuts 17 on their threaded ends. An axle 3 is thereby held rigidly in place between the spring 16 and angle-plates 10.

Figure 2:
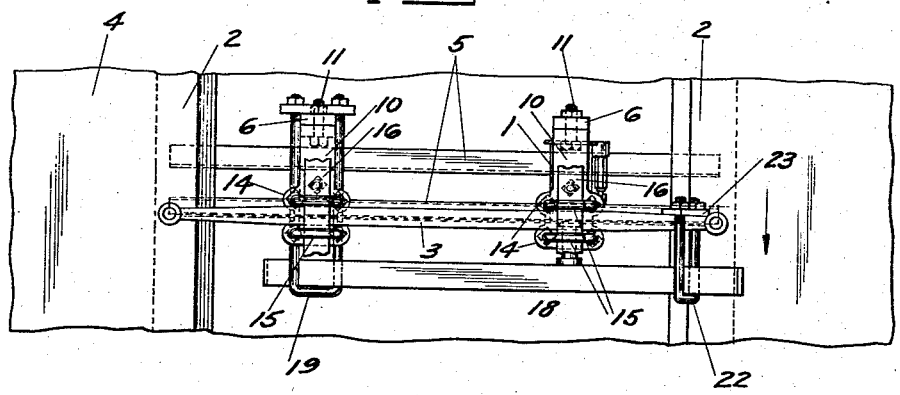
Fig. 2 is a plan view thereof.
Figure 3:
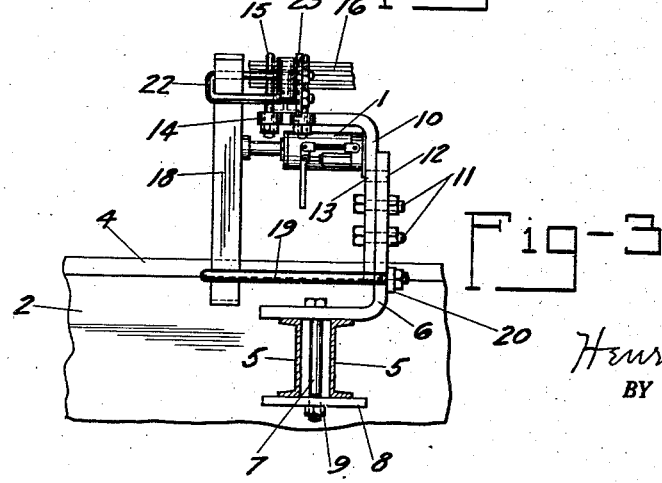
Fig. 3 is a cross-section through the channel-plates 5, on the line 3—3 of Fig. 1.

Supported transversely of the machine is a bar 18, by means of a loop 19 the ends of which are secured in a plate 20 bearing against the lower part of the angle-plate 6, and a smaller loop 22 secured to a plate 23 bearing against one end of the axle 3. A jack 1 is held between the angle-plate 10 which is nearest the loop 22, with the plunger thereof against one edge of the bar 18, and upon the jack being operated a force is applied to the bar tending to move the end thereof, and the end of the axle to which it is attached, in the direction of the arrow in Fig. 2, it being assumed that it is in this direction that the correction of the bend in the axle is to be made. By this means the axle can be straightened, not only at the ends thereof, but at points between the ends. If the bend in the axle is toward the opposite side the position of the axle in the machine is reversed before the bending operation takes place.

In case there is not sufficient space between the channel-plates 5 and the axle for the angle-plates 6 and 10 the plates 6 may be positioned beneath the plates 5, and the bolts 7 pass upwardly between the plates 5 and be secured to the plates 8 on the upper side thereof.

Changes can be made in the construction and arrangement of the various parts of the invention without departing from the spirit thereof, as set forth herein.

What I claim, and desire to secure by Letters Patent, is:

A press for automobile axles, comprising a fixed beam, a pair of frames rigidly connected with said beam and provided with axle supports, axle engaging devices on said supports, a loop connected with the lower end of one of said frames, a bar held at one end in said loop and extending diagonally to an intersection with an axle supported on said frames, means for connecting said bar with such axle, and means for exerting a pressure against said bar to bend said axle.

In testimony whereof I affix my signature.

HENRY WOCHNER.